United States Patent [19] [11] 4,124,404
Suzuki et al. [45] Nov. 7, 1978

[54] STEEL SLAG CEMENT AND METHOD FOR MANUFACTURING SAME

[75] Inventors: Gyoichi Suzuki, Tokyo; Ryo Ando, Yokohama; Tatsuo Koyama, Yokohama; Shoji Kubodera, Yokohama; Renichi Kondo, Tokyo, all of Japan

[73] Assignee: Nippon Kokan Kabushiki Kaisha, Tokyo, Japan

[21] Appl. No.: 804,328

[22] Filed: Jun. 7, 1977

[30] Foreign Application Priority Data

Jun. 23, 1976 [JP] Japan .................................. 51/73108

[51] Int. Cl.$^2$ ............................................. C04B 7/14
[52] U.S. Cl. ..................................... 106/103; 106/117
[58] Field of Search .............................. 106/103, 117

[56] References Cited

U.S. PATENT DOCUMENTS

| 2,116,469 | 5/1938 | Karwat | 106/103 |
| 2,471,562 | 5/1949 | Fitterer | 106/103 |
| 3,002,843 | 10/1961 | Stocker | 106/117 |
| 4,047,968 | 9/1977 | zur Strassen et al. | 106/117 |

Primary Examiner—J. Poer
Attorney, Agent, or Firm—Flynn & Frishauf

[57] ABSTRACT

A steel slag cement manufactured by reducing a steel slag discharged from a steelmaking furnace such as a converter, an open-hearth furnace or an electric arc furnace, and then oxidizing the steel slag thus reduced, which consists of, in weight percentage:

$CaO$ : 68 to 72%,
$SiO_2$ : 22 to 26%,
$Al_2O_3$ : 1 to 3%,
$Fe_2O_3$ : 0.2 to 1.0%,
$P_2O_5$ : 0.1 to 0.6%,
$TiO_2$ : 0.4 to 0.9%,
$MnO$ : trace to 0.4%,
$MgO$ : 0.3 to 3.0%,
$CaF_2$ : 0.3 to 2.0%, and the balance incidental impurities.

20 Claims, 6 Drawing Figures

A: REDUCED STEEL SLAG + SiO₂ (1.5%)
B: REDUCED STEEL SLAG + SiO₂ (1.5%) + Fe₂O₃ (0.39%)
1: EXTRA-HIGH-EARLY-STRENGH PORTLAND CEMENT
2: HIGH-EARLY-STRENGTH PORTLAND CEMENT
3: NORMAL PORTLAND CEMENT

A: MODIFIED BLAST-FURNACE CEMENT A
B: MODIFIED BLAST-FURNACE CEMENT B
C: MODIFIED BLAST-FURNACE CEMENT C
1: EXTRA-HIGH-EARLY-STRENGTH PORTLAND CEMENT
2: HIGH-EARLY-STRENGTH PORTLAND CEMENT
3: NORMAL PORTLAND CEMENT

STEEL SLAG CEMENT AND METHOD FOR MANUFACTURING SAME

FIELD OF THE INVENTION

The present invention relates to a steel slag cement manufactured from a steel slag discharged from a steelmaking furnace such as a converter, an open-hearth furnace or an electric arc furnace, and a method for manufacturing said steel slag cement.

BACKGROUND OF THE INVENTION

Steel slag is discharged in a very large quantity from a steelmaking furnace such as a converter, an open-hearth furnace or an electric arc furnace. Effective utilization or disposal of said steel slag is therefore one of the important tasks in the field of steelmaking.

A typical chemical composition, as expressed in weight percentage, of a steel slag, of example, a top-blowing oxygen converter slag, is as follows:

CaO: 50.4%
$SiO_2$: 15.3%
$Al_2O_3$: 1.00%
Total Fe: 16.3%
$P_2O_5$: 2.28%
$TiO_2$: 1.66%
MnO: 5.21%
MgO: 2.01%
$V_2O_5$: 1.21%

When such a steel slag is employed as a subbase course material or an aggregate (hereinafter simply called "aggregate"), said aggregate is always susceptible of disintegration under the effect of free lime (free CaO) and dicalcium silicate ($2CaO.SiO_2$) contained in said steel slag. In addition, because a steel slag contains considerable Fe constituents as mentioned above, the aggregate produced therefrom has a higher specific gravity than natural aggregates. For these reasons, steel slags are very rarely utilized as aggregates, but mostly disposed of as waste for reclamation at present.

In order to dispose of these large quantities of steel slag in the form of wastes for reclamation, however, vast places for reclamation are required, and the transportation thereof requires a substantial cost. Development of a method for effectively utilizing a steel slag only increasing in amount is therefore one of the important tasks requiring an urgent solution in the field of steelmaking.

Under such circumstances, many trials have been made to use a steel slag as a material for cement. For example, there have been proposed several methods, all based on basic ideas of bringing the chemical composition closer to that of the conventional Portland cement, which comprise, for example, adding a steel slag to a blast furnace cement comprising a blast furnace water-granulated slag and a Portland cement, or manufacturing a normal Portland cement from a steel slag. However, because a steel slag contains considerably phosphorus (P) and manganese (Mn) constituents which impair the strength of cement, the use of a steel slag in a large quantity as a material for cement cannot be expected even by any of the methods mentioned above.

In Japanese Patent Provisional Application No. 83,693/74, a method for manufacturing an alumina cement from a steel slag is proposed, which comprises reducing $P_2O_5$, MnO and FeO contained in a molten steel slag with carbon contained in a molten pig iron by bringing said molten steel slag added with alumina in contact with said molten pig iron and stirring them, thereby removing such constituents as phosphorus, manganese and iron by causing transfer of said constituents from said molten steel slag into said molten pig iron. This method however requires a large quantity of molten pig iron and much heat. In this method, furthermore, as mentioned above, such constituents detrimental to cement as phosphorus and manganese transfer from a molten steel slag into a molten pig iron. In order to reuse said molten pig iron in steelmaking, therefore, it is necessary to remove these detrimental constituents, and this requires much time and money together with many other difficulties.

SUMMARY OF THE INVENTION

An object of the present invention is therefore to provide a method for effectively utilizing a steel slag discharged in a large quantity from a steelmaking furnace such as a converter, an open-hearth furnace or an electric arc furnace.

Another object of the present invention is to provide a steel slag cement manufactured by reducing said steel slag and then oxidizing said steel slag thus reduced, and a method for manufacturing said steel slag cement. A principal object of the present invention is to provide conditions for said reduction, conditions for said oxidation, conditions for chemical composition of said steel slag cement, and conditions for chemical composition adjustment of said steel slag cement.

In accordance with one of the features of the present invention, there is provided a steel slag cement manufactured by reducing a steel slag discharged from a steelmaking furnace such as a converter, an open-hearth furnace, or an electric arc furnace, and then oxidizing the steel slag thus reduced, which consists of, in weight percentage:

CaO: 68 to 72%,
$SiO_2$: 22 to 26%,
$Al_2O_3$: 1 to 3%,
$Fe_2O_3$: 0.2 to 1.0%,
$P_2O_5$: 0.1 to 0.6%,
$TiO_2$: 0.4 to 0.9%,
MnO: trace to 0.4%,
MgO: 0.3 to 3.0%,
$CaF_2$: 0.3 to 2.0%, and the balance incidental impurities.

DETAILED DESCRIPTION OF PREFERRED EMBODIMENTS

In view of the conceivable possibility of employing a steel slag in a large quantity as a material for cement by removing phosphorus, manganese and other constituents detrimental to cement, from the above-mentioned point of view, we have conducted research on the following four points:

(a) conditions for reduction,
(b) conditions for oxidation,
(c) conditions for chemical composition, and
(d) conditions for chemical composition adjustment of a steel slag with a view to manufacturing, from a steel slag, a cement having properties superior to those of the conventional Portland cements by positively limiting conditions to be applied when removing phosphorus, manganese and other constituents detrimental to cement contained in a steel slag by reduction. As a result, we have obtained knowledge of the following four points (1) to (4):

(1) Conditions for reduction:

When reducing a steel slag with carbon, it is desirable to effect the reduction until the steel slag contains carbides (principally calcium carbide ($CaC_2$)), and as described later, it is necessary to effect the reduction until the carbides are formed in an amount of from 1 to 7 wt.%, preferably from 2 to 5 wt.% (hereinafter "%" indicates weight percentage in all cases) as expressed in carbon content. Presence of carbides in a prescribed amount in the steel slag after the reduction (hereinafter called "reduced steel slag") raises the reduction ratio, i.e., the ratio of removal of such constituents detrimental to cement as phosphorus and manganese contained in the steel slag, and at the same time, facilitates oxidation of the reduced steel slag in the next step.

Now, effects of the formation of carbides in the reduced steel slag mentioned above and reasons for limiting the amount of formed carbides are described in detail with reference to examples.

For the purpose of lowering the melting point and adjusting the chemical composition closer to that of the normal Portland cement, 4 parts of alumina ($Al_2O_3$), 4 parts of silica sand ($SiO_2$), 2 parts of fluorite ($CaF_2$) and 10 parts of lime (CaO) were added to 100 parts of a top-blowing oxygen converter slag as a steel slag, and 5 parts off solid carbonaceous reducing agent were further added, and they were mixed together. The resultant mixture was melted in a graphite crucible for reduction with the use of a high-frequency induction furnace. For the purpose of the reduction of a steel slag, it is needless to mention that any furnace selected from among an Heroult type electric arc furnace, a direct-energizing electric furnace employing Joule heat and a heating furnace employing such fuel as fuel gas and heavy oil may be used. In the afore-mentioned reduction step, said mixture produced gases immediately upon start of melting; the gases caused foaming, then calmed down.

At this time of calming-down, part of the molten steel slag was poured from said graphite crucible, cooled and solidified. Heating and reduction were further continued for the remaining molten steel slag in said graphite crucible, and at periods of 5 minutes, 10 minutes and 15 minutes from said calming-down, the molten steel slag was respectively poured from said graphite crucible and cooled for solidification. Finally, a metallic residue mainly comprising iron on the bottom of said graphite crucible was discharged therefrom.

The chemical composition of a cooled reduced steel slag obtained as a result, and the state thereof after the lapse of about 12 hours are shown in Table 1.

Table 1

| | Chemical composition (wt.%) | | | | | | | | | State of reduced steel slag after the lapse of about 12 hr. |
|---|---|---|---|---|---|---|---|---|---|---|
| | CaO | $SiO_2$ | $Al_2O_3$ | Total Fe | MnO | $P_2O_5$ | $TiO_2$ | $CaF_2$ | Total C | |
| At calming-down | 55.56 | 19.76 | 4.55 | 1.79 | 3.46 | 1.610 | 0.80 | 2.20 | 0.13 | Lumpy |
| After heating for 5 minutes from calming-down | 58.83 | 21.86 | 5.33 | 0.67 | 0.37 | 0.379 | 0.83 | 2.29 | 1.12 | Powdery |
| After heating for 10 minutes from calming-down | 61.14 | 22.28 | 5.40 | 0.22 | trace | 0.251 | 0.76 | 2.19 | 1.80 | Powdery |
| After heating for 15 minutes from calming-down | 61.94 | 21.83 | 5.59 | 0.11 | trace | 0.077 | 0.62 | 2.54 | 1.99 | Powdery |

In Table 1, the total C wt.% is mostly comprised carbon present in the form of carbides ($CaC_2$).

As mentioned above, the chemical composition of the top-blowing oxygen converter slag before said reduction is as follows:

CaO: 50.4%
$SiO_2$: 15.3%
$Al_2O_3$: 1.00%
Total Fe: 16.3%
$P_2O_5$: 2.28%
$TiO_2$: 1.66%
MnO: 5.21%
MgO: 2.01%
$V_2O_5$: 1.21%

As is clear from the results shown in Table 1, therefore, the removal of the constituents other than iron by reduction is not fully sufficient in the reduced steel slag at said calming-down. In the reduced steel slag subjected to heating and reduction for further 5 minutes from said calming-down, in contrast, the reduction proceeds rapidly and to such extent that the carbon content in the reduced steel slag increases to over 1%, i.e., to about ten times as high as that at said calming-down. Furthermore, in the reduced steel slag subjected to heating and reduction for 10 minutes from said calming-down, MnO is almost totally removed by reduction, and about 90% of $P_2O_5$ contained in the converter slag before said reduction is removed by reduction, whereas the carbon content is increased to almost 2%. Such reduced constituents detrimental to cement as manganese and phosphorus transfer into a metallic residue principally comprising iron on the bottom of the graphite crucible and are thus removed from the reduced steel slag.

Then, an X-ray diffraction test was carried out on the cooled reduced steel slags obtained at said respective moments during reduction, and results as shown in Table 2 were obtained.

Table 2

| Kind of reduced steel slag | $C_{54}S_{16}AM$ | $\beta$-$C_2S$ | $\gamma$-$C_2S$ |
|---|---|---|---|
| Reduced steel slag at calming-down | +++ | + | − |
| Reduced steel slag after heating for 5 minutes from calming-down | +++ | + | + |
| Reduced steel slag after heating for 10 minutes from calming-down | +++ | + | + |
| Reduced steel slag after heating for 15 minutes from calming-down | +++ | ++ | + |

In Table 2, $C_{54}S_{16}AM$, $\beta$-$C_2S$ and $\gamma$-$C_2S$ are abbreviations usually employed for cements, where C represents CaO; S, $SiO_2$; A, $Al_2O_3$; and M, MgO. $C_2S$ represents, for example, $2CaO.SiO_2$. In the same Table, the symbols "+++", "++" and "+" respectively indicate the extent of detection of these constituents, and the symbol "−" indicates that these constituents are not detected. These symbols have the following relation between each other:

+++ > ++ > + > −.

As shown in Table 2, in the reduced steel slag at the time of calming-down, no $\gamma$-$C_2S$ causing powdering of the reduced steel slag is detected. The reduced steel slag at said calming-down is not therefore powdered even after the lapse of about 12 hours and remains in the lumpy state, as shown in Table 1. On the contrary, in the reduced steel slags after heating for 5 minutes, 10 minutes and 15 minutes, respectively, from the calming-down for reduction, $\gamma$-$C_2S$ is present, and as a result, these reduced steel slags are mostly powdered spontaneously after the lapse of about 12 hours.

The lumpy reduced steel slag at said calming-down was mixed with 3% gypsum and finely pulverized so as to give a specific surface area of about 3,300 $cm^2/g$. One part of the resultant mixed powder was mixed with 2 parts of standard sand and 65% water and kneaded. Said kneaded mixture was formed and the compressive strength (hereinafter called the "1:2 mortar strength") of said formed mixture was measured, resulting in a value of only 140 $kg/cm^2$ at an age of 28 days. This value is very low as compared with the 1:2 mortar strength of a normal Portland cement of about 410 $kg/cm^2$. Also for the powdery reduced steel slags heated and reduced for 5 minutes, 10 minutes and 15 minutes, respectively, from the calming-down, the 1:2 mortar strength was similarly measured, resulting in a value of about 80 $kg/cm^2$ in all cases, which is far lower than that of the reduced steel slag at the calming-down mentioned above, and moreover an offensive smell of carbides was produced when kneading the powdery reduced steel slag with the addition of water.

As is evident from the above description and Table 1, removal of such constituents as phosphorus and manganese by reduction is not sufficiently effected in a reduced steel slag having a content of produced carbides of under 1% as expressed in carbon content, such as the reduced steel slag at the calming-down. On the contrary, in a reduced steel slag containing at least 1% produced carbides as expressed in carbon content such as the reduced steel slag heated and reduced for 5 minutes from said calming-down, such constituents as phosphorus and manganese are considerably removed by reduction. Furthermore, when a reduced steel slag contains at least 2% produced carbides as expressed in carbon content, as in the reduced steel slag heated and reduced for at least 15 minutes after said calming-down, manganese is almost totally removed by reduction, and there is also a remarkable decrease in the phosphorus content. The reduced steel slag containing at least 1% produced carbides are expressed in carbon content is almost totally powdered by the formation of $\gamma$-$2CaO.SiO_2$ after the lapse of about 12 hours. However, any one of these steel slags, irrespective of the time lapse from calming-down, is far inferior to the normal Portland cement in terms of the 1:2 mortar strength. The 1:2 mortar strength of the reduced steel slag containing at least 1% carbides as expressed in carbon content is further lower than that of the reduced steel slag containing under 1% carbides as expressed in carbon content, and hence has almost no practical value of being used as a cement.

Heating and reduction of the steel slag were further continued beyond the level shown in Table 1. At the moment when carbides were formed in an amount of 5.93% as expressed in carbon content in the reduced steel slag, the chemical analysis of a metallic residue on the bottom of the graphite crucible was measured. Results as shown in Table 3, except for iron constituents, were obtained.

Table 3

| Constituent | C | P | S | Si | Mn | Ti | V |
|---|---|---|---|---|---|---|---|
| wt.% | 5.75 | 3.20 | 0.004 | 2.41 | 13.70 | 5.44 | 2.48 |

The silicon content of 2.41% in said metallic residue shown in Table 3, if converted into $SiO_2$, corresponds to about 1% of the reduced steel slag. As described later, a reduced steel slag having a smaller $SiO_2$ content has only a limited utilization value as a material for cement. Therefore, when $SiO_2$ content in the reduced steel slag is further reduced beyond the level shown in Table 3 and removed through transfer of silicon into said metallic residue, i.e., when the steel slag is reduced to such extent that the amount of carbides produced in the reduced steel slag as expressed in carbon content exceeds 7%, it is necessary to add a large quantity of $SiO_2$ when adjusting the chemical composition of the reduced steel slag as described below. In addition, it is not easy to adjust the $SiO_2$ content. The reduction by heating beyond the above-mentioned level is therefore unfavorable in terms of raw material cost and required labor.

For the reasons mentioned above in detail, it is necessary to reduce the steel slag so that carbides may be formed in the reduced steel slag in an amount of from 1 to 7 wt.%, preferably from 2 to 5 wt.% as expressed in carbon content.

The example described above has covered the case of a top-blowing oxygen converter slag. It is needless to mention that substantially identical results are obtained also as to such steel slags as an open-hearth furnace slag and an electric arc furnace slag other than the top-blowing oxygen converter slag.

(2) Conditions for oxidation:

If the reduced steel slag obtained through reduction as mentioned above, which contains carbides ($CaC_2$), is used as a material for cement without further treatment, an offensive smell of carbides is produced when kneading with the addition of water, the resulting and slaked lime ($Ca(OH)_2$) causes degradation of the hydraulicity of cement, thus making it impossible to obtain a necessary strength of cement. The direct use of said reduced steel slag as a material for cement is therefore impossible for these reasons, as previously mentioned in the description of conditions for reduction. In order to use a steel slag as a material for cement, therefore, it is absolutely necessary to effect an oxidation step for removing the carbon in the form of carbides ($CaC_2$) produced in the reduced steel slag during the above-mentioned reduction step.

The desired effect cannot however be achieved only through oxidation of the reduced steel slag. It is also necessary to effect a sufficient reaction of CaO produced by the oxidation of carbides ($CaC_2$) with $SiO_2$ as well as to give close attention to the cooling of the steel slag after oxidation.

Reduction is effected in the aforementioned reduction step until carbides are produced in the reduced steel slag, because of the advantage of favorably facilitating the oxidation step mentioned below, in addition to the advantage of removing such constituents detrimental to cement as phosphorus and manganese, as mentioned above. This oxidation step provides the following advantages in the case where the reduced steel slag is oxidized in solid state, and in the case where the reduced steel slag is oxidized in molten state.

(a) When the reduced steel slag is oxidized in solid state:

When a molten reduced steel slag is once cooled and solidified, and then oxidized in solid stage, it is necessary to finely pulverize said solidified reduced steel slag. However, as mentioned above, in the presence of at least 1% carbides in the reduced steel slag, said reduced steel slag spontaneously becomes a fine powder under the effect of dusting phenomenon. Furthermore, in the reduced steel slag powdered under the effect of this dusting phenomenon, only the steel slag is powdered and the metallic constituents, mainly comprising iron, in the reduced steel slag are present in the form of relatively large particles. It is therefore possible to conduct an easy and complete separation of said metallic constituents from the reduced steel slag by magnetic separation. On the contrary, a reduced steel slag in which almost no carbides are present should be finely pulverized, since powdering under the effect of dusting phenomenon cannot be expected in this case. This requires not only a very high pulverizing cost and much labor, but also makes it impossible to avoid entanglement of part of pulverized metallic constituents into the powdered steel slag even by conducting magnetic separation after the pulverization, because said metallic constituents are also finely pulverized. All these drawbacks reduces the effect of reduction.

The presence of at least 1% carbides in the reduced steel slag ensures powdering by only leaving said slag as it is, thus resulting in a fine powder favorable for the oxidation of the reduced steel slag. Studies which we have carried out revealed that there are the following differences in the state of oxidation between the case where the oxidation of the reduced steel slag is conducted in powdery state and the case where said oxidation is conducted after briquetting the powdery reduced steel slag.

A reduced steel slag in powdery state and another reduced steel slag in small briquettes made by kneading said powdery reduced steel slag with the addition of water and forming thus kneaded slag were put into respective crucibles made of alumina, and subjected to oxidation by heating these crucibles in open air at a temperature of 1,450° C. for 2 hours. Results show that the oxidized steel slag obtained through oxidation in powdery state contained at least 1%, and even 6% in the extreme case, of free lime (free CaO), which is generally considered as a cause of concrete disintegration when used as cement, and in the 1:2 mortar strength test, the strength thereof did not reach 50 kg/cm$^2$ in most cases at an age of 7 days. In the oxidized steel slag obtained through oxidation of briquetted steel slag, in contrast, the free lime content was under 1% in most cases and only 0.06% in the extreme case, and the 1:2 mortar strength test showed a strength of over 100 kg/cm$^2$ at an age of 7 days in most cases. When oxidation is applied after briquetting a powdery reduced steel slag, the distance between particles becomes smaller than in the oxidation of a powdery slag, thus permitting sufficient combination and reaction between free lime and $SiO_2$ in the oxidation step.

Now, the state of oxidation of a reduced steel slag in solid state is further described by way of examples.

For the purpose of adjusting the chemical composition closer to that of the normal Portland cement, 4 parts of Alumina ($Al_2O_3$) and 2 parts of silica sand ($SiO_2$) were added to 94 parts of a top-blowing oxygen converter slag having the chemical composition described above, and 7 parts of solid carbonaceous reducing agent were further added, and they were mixed together. The resultant mixture was heated and reduced in a crucible until the carbides were produced in an amount of 2% as expressed in carbon content. Then, the reduced steel slags thus obtained and spontaneously finely powdered by the dusting phenomenon, in powdery state as it is and in the form of briquettes, were put in alumina crucibles and oxidized by heating and holding at a temperature of 1,450° C. for 2 hours in open air, respectively.

Chemical compositions of oxidized steel slags obtained as a result are shown in Table 4.

Table 4

| State of oxidation | Chemical composition (wt.%) | | | | | | |
|---|---|---|---|---|---|---|---|
| | CaO | SiO$_2$ | Al$_2$O$_3$ | Total Fe | MnO | P$_2$O$_5$ | Free CaO |
| Powder | 68.1 | 23.4 | 6.46 | 0.83 | 0.19 | 0.49 | 2.16 |
| Briquette | 66.7 | 23.3 | 6.38 | 1.02 | 0.18 | 0.47 | 0.45 |

As is clear from the results shown in Table 4, the content of free lime (free CaO) is considerably decreased in the oxidized steel slag obtained through oxidation of briquetted reduced steel slag as compared with that in the oxidized steel slag obtained through oxidation of said slag in powdery state.

On the assumption of the presence of carbides in the form of $CaC_2$ in an amount of 2% as expressed in carbon content in the reduced steel slag, calculation of CaO content in the case where said $CaC_2$ is oxidized into CaO gives a value corresponding to about 4% of the reduced steel slag. Therefore, in order that CaO produced from said $CaC_2$ in the oxidation of the solid reduced steel slag becomes a $CaCO—SiO_2$ compound effective as a constituent of cement, it is effective to reduce the distance between particles by briquettes the powdery reduced steel slag.

Then, the respective oxidized steel slags having chemical compositions as shown in Table 4 were mixed with 3% gypsum and finely pulverized so as to give a specific surface area of about 2,300 $cm^2/g$, and the 1:2 mortar strength of the finely powdered oxidized steel slags thus obtained at an age of 7 days was measured. In said measurement, the oxidized steel slag obtained through oxidation in powdery state showed a strength of only 120 $kg/cm^2$, whereas the oxidized steel slag obtained through oxidation in briquetted state showed a strength of 190 $kg/cm^2$.

It is evident from the aforementioned results that two reduced steel slags, even if obtained through reduction under the same conditions, lead to a considerable difference in strength when used as materials for cement, depending upon the conditions for the subsequent oxidation step. In the oxidation step, in particular, it was proved that a cement having a high strength can be manufactured by effectively combined CaO produced from the decomposition of carbides ($CaC_2$) present in the reduced steel slag with $SiO_2$.

(b) When the reduced steel slag is oxidized in molten state:

When oxidizing a molten reduced steel slag after the completion of reduction step in molten state without cooling for solidification, the presence of carbides in said reduced steel slag permits easy oxidation by simply blowing oxygen, for example. A reduced steel slag has in general a melting point as high as 1,700° C., and carbides, if present in the reduced steel slag, produce a high temperature during their oxidation. It is therefore possible to achieve an effective oxidation of said reduced steel slag. If carbides are not present in the reduced steel slag, and hence oxidation of said reduced steel slag should be carried out with the use of only heat supplied from outside, then, it would be necessary, for example when using a heating gas, to raise the heating gas temperature to a very high level. It is however difficult to maintain a high thermal efficiency.

In the oxidation of a molten reduced steel slag, another advantage of the presence of carbides in said reduced steel slag lies in that CO gas and/or $CO_2$ gas produced by the oxidation of carbides present in the reduced steel slag cause bubbling of the molten steel slag, and this ensures very satisfactory stirring and mixing or said molten steel slag. Stirring and mixing of molten steel slag by CO gas and/or $CO_2$ gas mentioned above exert an important effect of uniform mixing of silica sand ($SiO_2$) into said molten steel slag when adding silica sand as a chemical composition adjusting agent, in addition to the effect of further improving the thermal efficiency in the oxidation step.

More specifically, the range of chemical compositions of Portland cements is generally very narrow. In the manufacture of a normal Portland cement, for instance, it is necessary to blend materials with the closest attention by a known silo system and to ensure uniform mixing of said materials. The range of chemical compositions of the steel slag cement of the present invention is also relatively narrow. As mentioned above, however, CO gas and/or $CO_2$ gas produced by the oxidation of carbides present in the reduced steel slag ensure sufficient stirring and mixing of the molten steel slag, and this is very favorable since uniform mixing of materials is indispensable also for the steel slag cement of the present invention. If stirring and mixing of the molten steel slag as mentioned above are not caused by the produced gases, it would be necessary to cause a forced bubbling of the molten steel slag with the use of gas blowing or other means. In this case, however, preheating equipment for blown gas and bubbling equipment should be installed, and this results in a variety of problems such as considerably complicated facilities and operations and a higher operating cost.

In the stirring and mixing of a molten steel slag based on a batch system, in general, sufficient stirring and mixing of the molten steel slag can be ensured, even with a stirring means having a somewhat poor capacity, by providing a longer stirring period. In the stirring and mixing of a molten steel slag based on a continuous system, in contrast, a long stirring period is not desirable, and a strict limitation would thus be imposed on the stirring means. As described above, however, when carbides are present in the molten reduced steel slag, CO gas and/or $CO_2$ gas produced by the oxidation of said carbides in the oxidation step of said reduced steel slag lead to very satisfactory stirring and mixing of the molten steel slag, thus permitting operation based on continuous system.

Furthermore, oxidation of the reduced steel slag in molten state as it is may be considered as an ideal condition for the combination of CaO and $SiO_2$. An oxidized steel slag, if containing considerable MgO, is susceptible to crack formation when used as cement. Therefore, when an oxidized steel slag contains considerable MgO, it is necessary to vitrify said MgO to make it harmless by quenching said oxidized steel slag. By oxidizing the reduced steel slag in molten state as it is, therefore, it is possible, at the time of cooling the oxidized steel slag for solidification, to convert said steel slag into small molten droplets, and hence to very favorably quench said oxidized steel slag.

Now, the state of oxidation of the reduced steel slag in molten state is described further by way of examples.

For the purpose of adjusting the chemical composition closer to that of a normal Portland cement, 4 parts of alumina ($Al_2O_3$) and 2 parts of silica sand ($SiO_2$) were added to 94 parts of a top-blowing oxygen converter slag having the chemical composition described above, and 7 parts of solid carbonaceous reducing agent were further added, and they were mixed together. The resultant mixture was heated and reduced in a crucible until the carbides were produced in an amount of 2% as expressed in carbon content. Then, 3 parts of solid carbonaceous reducing agent were added to 100 parts of the reduced steel slag thus obtained and spontaneously finely powdered by the dusting phenomenon, and they were mixed together. The resulting mixture obtained was put into a crucible made of zirconia refractory and heated to a temperature of 1,800° C. while preventing oxidation in a stream of argon gas, to obtain a molten reduced steel slag. Subsequently, said argon gas was switched over to an air stream enriched with 3% oxygen to oxidize said molten steel slag. In the above-mentioned oxidation step, strong bubbling was caused in the molten steel slag; the temperature exceeded 1,800° C., and the bubbling then calmed down. Oxidation of the reduced steel slag was thus completed.

The molten oxidized steel slag thus obtained was poured from said crucible, cooled and solidified, and the chemical composition thereof was analyzed. Results showed that carbon as carbides ($CaC_2$) or even free lime was almost non-existent in said oxidized steel slag.

The measurement of the 1:2 mortar strength of said oxidized steel slag gave a strength of 200 kg/cm$^2$ at an age of 7 days. This value of strength is a little higher than the strength of 190 kg/cm$^2$ of the oxidized steel slag obtained through oxidation applied after briquetting a powdery reduced steel slag, as described in (2) · (a) above.

Conclusions reached from these results are: that the oxidation of a reduced steel slag in molten state as it is leads to a very strong and rapid oxidation reaction; that the heat produced in oxidation causes increase in the temperature of the molten steel slag and gives a sufficient fluidity; and that almost no free lime remains in the oxidized steel slag.

(3) Conditions for chemical composition:

A typical chemical composition of a normal Portland cement in the clinker condition (hereinafter simply called "the conventional cement") is as follows in weight percentage:

CaO: 66.0%,
$SiO_2$: 22.7%,
$Al_2O_3$: 5.66%,
$Fe_2O_3$: 2.62%,
$P_2O_5$: 0.10%,
$TiO_2$: 0.35%,
MnO: 0.02%,
MgO: 1.41%,
$CaF_2$: 0.3%, ps and
the balance incidental impurities.

On the other hand, the steel slag cement of the present invention, is manufactured by reducing and then oxidizing a steel slag under the conditions described hereinbefore so far in detail, and has the following chemical composition, in weight percentage:

CaO: from 68 to 72%,
$SiO_2$: from 22 to 26%,
$Al_2O_3$: from 1 to 3%,
$Fe_2O_3$: from 0.2 to 1.0%,
$P_2O_5$: from 0.1 to 0.6%,
$TiO_2$: from 0.4 to 0.9%,
MnO: from trace to 0.4%,
MgO: from 0.3 to 3.0%,
$CaF_2$: from 0.3 to 2.0%,
and the balance incidental impurities.

The steel slag serving as the material for the steel slag cement of the present invention is not prepared specially so as to have a specific chemical composition, but is produced as a by-product in the course of steelmaking. Furthermore, the ratio of reduction of the individual constituents of said steel slag in the reduction step mentioned above varies between constituents. Therefore, the range of contents of the constituents other than CaO, $SiO_2$ and $Al_2O_3$ in the steel slag cement of the present invention is slightly wider than that of the conventional cement.

Now, the reasons why the range of the chemical composition of the steel slag cement of the present invention is limited as mentioned above are described below while comparison is made with the chemical composition of the conventional cement.

(a) CaO, $SiO_2$ and $Al_2O_3$:

The compounds of CaO and $SiO_2$, especially tricalcium silicate ($3CaO.SiO_2$), are the most important constituents in displaying the strength of cement. In the present invention, therefore, the CaO content is adjusted within a range of from 68 to 72% and the $SiO_2$ content is adjusted within the range of from 22 to 26% in the oxidized steel slag, i.e., in the steel slag cement of the present invention, so as to give a $CaO/SiO_2$ ratio of from 2.61 to 3.27 thereby increasing the amount of produced $3CaO.SiO_2$. This point is further described below.

The formation temperature of $3CaO.SiO_2$ in a cement material not containing $Al_2O_3$ is as high as about 1,700° C. In the manufacture of the conventional cement, therefore, it is the usual practice to intentionally add a clay containing alumina ($Al_2O_3$) for the purpose of lowering the burning temperature of a cement material as well as increasing the content of $3CaO.SiO_2$. As a result, the conventional cement usually contains from about 4 to 6% $Al_2O_3$.

However, a considerable content of $Al_2O_3$ in a cement material is not desirable because of the following disadvantages:

(i) It increases the amount of produced $3CaO.Al_2O_3$. Since said $3CaO.Al_2O_3$ imparts the flash setting property to a cement, it is necessary to prevent said flash setting property by adding considerable gypsum;

(ii) It increases the produced heat of a cement;

(iii) It decreases the amount of produced $3CaO.SiO_2$; and (iv) It impairs the strength of cement.

In the present invention, carbides produced in the reduction step give a high temperature along with the oxidation in the oxidation step. It is not therefore necessary to add positively $Al_2O_3$ as in the manufacture of the conventional cement. Consequently, in the present invention, it suffices to use $Al_2O_3$ contained in the steel slag as the material without positively adding additional $Al_2O_3$.

In the present invention, the $Al_2O_3$ content is limited within the range of from 1 to 3%, because an $Al_2O_3$ content of under 1% brings about no practical benefit but requires a higher operating cost, whereas an $Al_2O_3$ content of over 3% results in too serious disadvantages as mentioned above and impairs the utilization value as a cement having early-strength and high-strength.

In the steel slag cement of the present invention, as described above, the contents of the three constituents, i.e., $CaO_2$ and $Al_2O_3$ are limited. As shown in the partial ternary constitutional diagram of $CaO-SiO_2-Al_2O_3$ given in FIG. 1, the area representing the range of said three constituents in the conventional cement is situated on the side of higher $SiO_2$ content relative to the line connecting $3CaO.SiO_2$ and $3CaO.Al_2O_3$, and is traversed by the line connecting $3CaO.SiO_2$ and $12CaO.7Al_2O_3$. On the contrary, the area representing the range of said three constituents in the steel slag cement of the present invention is situated, as is clear from FIG. 1, on the side of higher $SiO_2$ content relative to the line connecting $3CaO.SiO_2$ and $3CaO.Al_2O_3$, as in the conventional cement, but the line connecting $3CaO.SiO_2$ and $12CaO.7Al_2O_3$ does not traverse said area, which furthermore does not overlap with the area of the above-mentioned constitutional range for the conventional cement. This forms an important feature of the steel slag cement of the present invention.

(b) $Fe_2O_3$:

$Fe_2O_3$ not only serves as a flux in the manufacture of cement and facilitates burning and reaction of materials for cement, but also plays an important role of imparting the grey tone intrinsic to cement. Since materials for the conventional cement do not contain $Fe_2O_3$ in a desired amount, it is the usual practice to intentionally add $Fe_2O_3$ in the manufacture of the conventional cement. As a result, the conventional cement usually contains from 3 to 5% $Fe_2O_3$. However, a high $Fe_2O_3$ content is not desirable because it impairs the early-strength and the high-strength of the cement.

More specifically, if a material for cement contains considerable $Fe_2O_3$, a large quantity of CaO is consumed for the formation of tetracalcium ferro-aluminate ($4CaO.Al_2O_3.Fe_2O_3$) in the burning of the material for cement. The amount of free CaO decreases and is therefore not available for the formation of $3Ca.SiO_2$, which is the main factor for achieving the necessary early-strength and the high-strength of the cement.

In the manufacture of the steel slag cement of the present invention, a steel slag containing up to about 16% Fe constituents is used as the starting material. If the reduction of steel slag mentioned above is sufficiently carried out, the Fe content in the reduced steel slag is decreased to about 0.1% as shown in Table 1. However because, actually, a metallic residue principally comprising Fe, produced during the reduction step of steel slag remains in the reduced steel slag, or said metallic residue is entangled into the reduced steel slag when separating said metallic residue from the reduced steel slag, the content of Fe constituents in the reduced steel slag actually obtained is somewhat higher than 0.1%. As a result, said Fe constituents become $Fe_2O_3$ during the oxidation of the reduced steel slag. In the present invention, therefore, it is not necessary to intentionally add $Fe_2O_3$, but it suffices to utilize the Fe constituents contained in the steel slag as the starting material.

In the present invention, the $Fe_2O_3$ content is limited within the range of from 0.2 to 1.0%, because with an $Fe_2O_3$ content of under 0.2%, the above-mentioned $Fe_2O_3$-adding effect cannot be obtained and the operating cost increases whereas an $Fe_2O_3$ content of over 1.0% impairs the early-strength and the high-strength of cement.

(c) $P_2O_5$:

While some researchers advocate that a $P_2O_5$ content of about 0.2% improves the strength of cement, it is generally considered that the smallest possible $P_2O_5$ content in cement is preferable. Materials for a conventional cement contain only trace amounts of $P_2O_5$, resulting in a small $P_2O_5$ content of about 0.1% in the conventional cement, and thus raising no serious problems as to the $P_2O_5$ content. In contrast, because the steel slag used as the starting material in the present invention contains about 2% $P_2O_5$, the $P_2O_5$ content in the steel slag cement of the present invention is higher than that of the conventional cement.

However, it is now clearly known that the strength of cement is seriously decreased by at least 1% $P_2O_5$. In the present invention, therefore, $P_2O_5$ is removed through reduction in the reduction step of steel slag.

In the present invention, the $P_2O_5$ content is limited within the range of from 0.1 to 0.6% because, with a $P_2O_5$ content decreased to under 0.1%, not only no remarkable effect is available, but also a higher operating cost is required, whereas with a $P_2O_5$ content of over 0.6%, adverse effects on the early-strength and the high-strength of cement begin to appear. A large quantity of $P_2O_5$ is unfavorable in the oxidation of the reduced steel slag in solid state described previously, since dusting phenomenon of the cooled reduced steel slag does not take place. Also from this point, a $P_2O_5$ content of up to 0.6% is preferable.

(d) $TiO_2$:

$TiO_2$ is a detrimental constituent which degrades the initial strength of a cement, and a smaller $TiO_2$ content in cement is believed to be better. Materials for a conventional cement contain only a slight amount of $TiO_2$, resulting usually in such a small $TiO_2$ content as about 0.3% in the conventional cement, and thus raising no serious problems as to the $TiO_2$ content. In contrast, because the steel slag used as the material in the present invention contains about 1.7% $TiO_2$, it is necessary to remove $TiO_2$ through reduction in the reduction step of steel slag as described previously in the present invention.

However because $TiO_2$ is hardly reducible as compared with the other constituents, it is necessary to add a large quantity of carbon as a reducing agent in order to remove $TiO_2$ sufficiently through reduction in the reduction step of steel slag. But the addition of a large quantity of carbon results also in the reduction of $SiO_2$, which is an important constituent of cement, in a large quantity. This requires the addition of a large quantity of $SiO_2$ for the adjustment of chemical composition, and is hence unfavorable in terms of cost. Therefore, although the $TiO_2$ content should preferably be the smallest possible, there is an inevitable limit in the extent of its removal through reduction from considerations of operating convenience and cost. According to our studies the $TiO_2$ content in cement, even if decreased to under 0.4%, gives no particular effect for the required labor and cost, whereas a $TiO_2$ content of over 0.9% impairs the initial strength of cement.

For the aforementioned reasons, the $TiO_2$ content is limited within the range of from 0.4 to 0.9% in the present invention. The $TiO_2$ content in the steel slag cement of the present invention, which is higher than that in a conventional cement, never exerts an adverse effect on the initial strength of cement if it is within the above-mentioned range.

(e) MnO:

MnO impairs the strength of cement and affects the color of cement. Accordingly as the MnO content becomes higher, the cement is increasingly tinted with brown and loses its peculiar grey tone. It is therefore generally believed that the smallest possible MnO content in cement is preferable. Materials for a conventional cement contain only a very slight amount of MnO, resulting usually in such a small MnO content as about 0.02% and thus raising no serious problems as to the MnO content.

In contrast, the steel slag serving as the material in the present invention contains such a relatively large quantity of MnO as about 5%. However, because MnO is easily reducible as compared with such constituents as $TiO_2$, it is not so difficult to remove it through reduction to the extent of trace amounts in the reduction step of steel slag mentioned previously. On the other hand, an MnO content of up to 0.4% does not impair the strength of cement, and does not cause considerable change in color of cement into brown.

For the aforementioned reasons, the MnO content is limited within the range of from a trace to 0.4% in the present invention. The upper limit of the MnO content in the steel slag cement of the present invention is higher than that in the conventional cement, as is clear from the above description. The steel slag cement of the present invention is therefore slightly tinted with yellow-brown and gives hence a warm feeling. It is consequently called "warm cement".

(f) MgO:

In a conventional cement, MgO is one of the impurities inevitably coming from the material. A high MgO content in cement leads to the formation of abnormally expanding compounds and causes cracks in the concrete. The Japan Industrial Standard (JIS) therefore specifies an upper limit of MgO content in cement of 5%. Chronologically, JIS had once specified an upper limit of the MgO content of 3%. An upper limit of 5% for the MgO content was later found to cause no trouble, and the value of upper limit for the MgO content was modified into 5%, as described above. If a high MgO content is allowable in the manufacture of a cement, there would be a wider range for the selection of a limestone for use as a cement material, and this would be favorable in terms of the availability of materials. However, the conventional cements commercially available usually have an MgO content of up to 1.5%.

The MgO content in the steel slag serving as the material in the present invention is originated from refractories forming the wall of a furnace such as a converter, which has eroded and entered into said steel slag. Therefore, the MgO content in the steel slag, varying with the material for the refractory used as the wall of a furnace such as a converter and the steel refining method, is about 2%. In the present invention, MgO is removed through reduction in the reduction step of steel slag mentioned previously.

The alite constituent, which is the most important constituent for the achievement of a necessary strength of cement and is usually expressed as $3CaO.SiO_2$, is more accurately represented by $54CaO.16SiO_2.Al_2O_3.MgO$. MgO has a solid-solution limit of 1.5% into alite. When MgO is present in an amount of more than 3%, MgO forms a solid-solution into the other constituents, thus reducing the amount of produced alite and this is more unfavorable. Also in terms of the early-strength and the high-strength of cement, it is not desirable that the MgO content should exceed 3%. Therefore, although an upper limit for the MgO content of up to 5% is believed to cause no disadvantage, the uppermost value of the MgO content is limited to 3% in the present invention. On the other hand, even if the MgO content is decreased to under 0.3%, there is available no particular effect for the required cost and labor.

For the aforementioned reasons, the MgO content is limited within the range of from 0.3 to 3.0% in the present invention.

(g) $CaF_2$:

Because $CaF_2$ acts as a fluxing agent in the burning of cement and lowers the burning temperature, fluorite containing a large quantity of $CaF_2$ is sometimes added in an amount of up to about 2% in the manufacture of a conventional cement. In the manufacture of the recently developed extra-high-early-strength cement known as the jet cement, $11CaO.7Al_2O_3.CaF_2$, which is an effective constituent for the extra-high-early-strength is formed by adding $Al_2O_3$ in an amount of about 11%, i.e., almost twice as large as the $Al_2O_3$ content in the conventional cement, and also by adding about 3% $CaF_2$. However, the $CaF_2$ content in the conventional cement is usually as small as about 0.3%.

In the refining of steel, especially in a converter, fluorite ($CaF_2$) is added as a flux, whereas the recent shortage of fluorite resources is urging consideration of an operating practice not requiring the addition of fluorite. With this tendency in view, there is a rather wide range of $CaF_2$ contents in the steel slag serving as the material in the present invention.

$Al_2O_3$ contained in the reduced steel slag first produces tetracalcium Ferro-Aluminate ($4CaO.Al_2O_3.Fe_2O_3$), and then, the remaining $Al_2O_3$ forms tricalcium aluminate ($3CaO.Al_2O_3$). Since $3CaO.Al_2O_3$ is not necessarily effective for the early-strength and the high-strength of cement, and in addition, imparts the flash setting property to the cement, it is necessary to reduce said flash setting property by adding gypsum. Therefore, $3CaO.Al_2O_3$ is rather an undesirable constituent. Although the steel slag cement of the present invention has such a small $Al_2O_3$ content, as compared with a conventional cement, as from 1 to 3%, $3CaO.Al_2O_3$ is formed because of the small content of $Fe_2O_3$. However, because the presence of $CaF_2$ causes not the production of $3CaO.Al_2O_3$ but that of $11CaO.7Al_2O_3.CaF_2$ in place thereof, the flash setting property is not imparted to the cement in this case. This permits reduction of the water/cement ratio, and in consequence, a high-strength of cement can be obtained.

On the other hand, a high $CaF_2$ content leads to such disadvantages as impairing the production of $3CaO.SiO_2$.

In the present invention, the $CaF_2$ content is limited within the range of from 0.3 to 2.0%, because a $CaF_2$ content of under 0.3% gives only a limited effect of $CaF_2$ addition as described above, whereas a $CaF_2$ content of over 2.0% results in serious disadvantages as mentioned above.

(h) Incidental impurities:

The steel slag cement of the present invention contains, in addition to the above-mentioned constituents, such other constituents as $V_2O_5$ and alkaline constituents such as $Na_2O$ and $K_2O$, as incidental impurities.

$V_2O_5$:

Almost no $V_2O_5$ is contained in the conventional cement. The steel slag cement of the present invention, which is manufactured from a steel slag, contains $V_2O_5$. Although about 90% of $V_2O_5$ is reduced through reduction during the reduction step of steel slag as mentioned previously, the steel slag cement of the present invention contains from trace amounts to 0.2% $V_2O_5$.

$Na_2O$, $K_2O$ and other alkaline constituents:

In the manufacture of the conventional cement, a clay is employed as an $Al_2O_3$ source. A clay contains such alkaline constituents as $Na_2O$ and $K_2O$. The conventional cement consequently contains usually about 1% alkaline constituents. Although such alkaline constituents as $Na_2O$ and $K_2O$ are not desirable because of their action to cause shrinkage of concrete, their inclusion is allowed since there is no other less expensive $Al_2O_3$ source than a clay.

On the contrary, in the present invention, these alkaline constituents are mostly removed through evaporation during the reduction step of steel slag as described previously. Therefore, there is only a trace amount of alkaline constituents in the steel slag cement of the present invention.

The chemical composition of the steel slag cement of the present invention has been described in comparison with that of conventional cement. In summary, the steel slag cement of the present invention differs in chemical composition from conventional cement in that the former contains less $Al_2O_3$, $Fe_2O_3$ and alkaline constituents than the latter, whereas $P_2O_5$, MnO, $TiO_2$ and $CaF_2$ constituents are greater in the former than in the latter.

Figure 1:
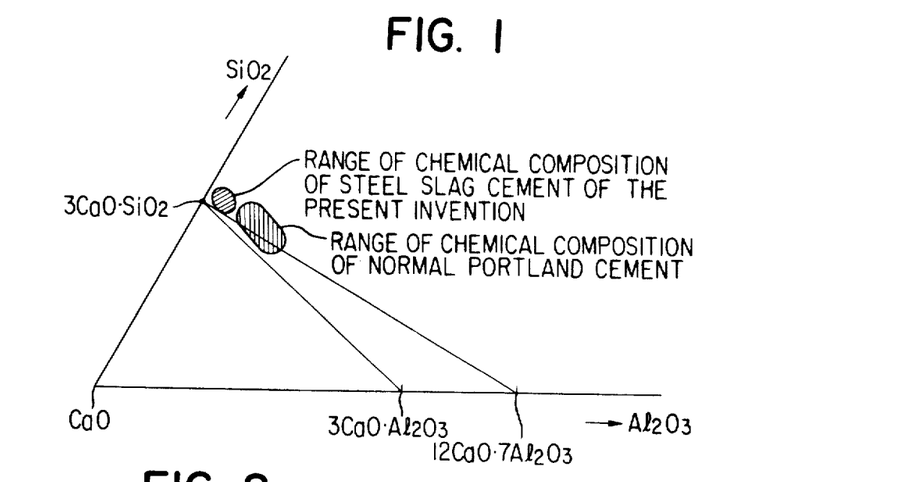
FIG. 1 is a partial ternary constitutional diagram of $CaO-SiO_2-Al_2O_3$ as to the steel slag cement of the present invention and a conventional normal Portland cement outside the scope of the present invention.

(4) Conditions for chemical composition adjustment:

In the manufacture of the steel slag cement of the present invention, as mentioned above, the chemical composition is adjusted so that the contents of the three constituents, i.e., CaO, $SiO_2$ and $Al_2O_3$, as represented in the range of chemical composition given in FIG. 1, may be, respectively:

CaO: 68 to 72%,
$SiO_2$: 22 to 26%, and
$Al_2O_3$: 1 to 3%, and the $CaO/SiO_2$ ratio may be found from 2.61 to 3.27 by adding to the above-mentioned reduced steel slag a small amount of silica sand ($SiO_2$) and/or lime (CaO), particularly silica sand. Constituents other than $SiO_2$ and CaO, including $Al_2O_3$ and $Fe_2O_3$, are not added to the reduced steel slag. Even in the present invention, however, as in the case of the conventional cement, the $CaSO_4/Al_2O_3$ molar ratio may sometimes be adjusted to from 0.7 to 1.0 by adding gypsum.

Now, these manners of chemical composition adjustment are described in detail by way of examples.

(a) Pulverizing particle size:

An oxidized steel slag clinker was obtained by heating to and holding at a temperature of 1,450° C. for 2 hours in open air a reduced steel slag obtained by reducing a top-blowing oxygen converter slag, in an alumina crucible having the following chemical composition:

CaO: 71.2%,
$SiO_2$: 23.1%,
$Al_2O_3$: 1.77%,
Total Fe: 0.53%,
$P_2O_5$: 0.56%
$TiO_2$: 0.57%,
MnO: trace,
MgO: 2.05%, and
$V_2O_5$: trace.

Then, four differently sized cements were prepared by finely pulverizing said clinker so as to give four different specific surface areas of 2,290 cm$^2$/g, 2,610 cm$^2$/g, 3,990 cm$^2$/g and 5,090 cm$^2$/g. Subsequently, the 1:2 mortar strength was measured at ages of said cements of 3 days, 7 days and 28 days, and results as shown in Table 5 were obtained.

Table 5

| Specific surface area (pulverizing particle size) | Water/ cement ratio (W/C) | Compressive strength (kg/cm$^2$) | | |
|---|---|---|---|---|
| | | 3 days | 7 days | 28 days |
| 2,290 | 0.65 | 128 | 174 | 310 |
| 2,610 | 0.63 | 187 | 264 | 369 |
| 3,990 | 0.62 | 146 | 233 | 380 |
| 5,090 | 0.56 | 297 | 489 | 584 |

A conventional cement has a particle size as represented by the specific surface area of 3,300 cm$^2$/g, and a 1:2 mortar strength thereof coming in between the specific surface areas of 2,610 cm$^2$/g and 3,990 cm$^2$/g shown in Table 5. Even by reducing the particle size, the strength of the conventional cement is not largely increased. On the contrary, the strength of the cement obtained from the oxidized steel slag is considerably increased by reducing the particle size, as shown in Table 5. No further constituents were added to the above-mentioned reduced steel slag. Said oxidized steel slag, i.e., said clinker, was therefore obtained through oxidation of only the reduced steel slag.

Then, the clinker of said oxidized steel slag was analyzed. Although it has been expected that almost no free lime (free CaO) would be present because of the sufficient oxidation treatment, there was present free lime in such a high percentage as 4.82%.

Study of said clinker with reference to the CaO—$SiO_2$—$Al_2O_3$ ternary constitutional diagram revealed that the $CaO/SiO_2$ ratio exceeds 3.27, i.e., the chemical composition of said clinker is situated on the side of higher CaO content relative to the line connecting $3CaO.SiO_2$ and $3CaO.Al_2O_3$, thus, resulting in a chemical composition of said clinker involving the precipitation of the free lime in spite of the sufficient oxidation treatment.

(b) Addition of $SiO_2$:

As described above, the oxidation of only the reduced steel slag without addition of further constituents results in an oxidized steel slag having a chemical composition which gives precipitation of free lime. With this finding in view, $SiO_2$ was added in percentages of 1.5%, 3%, and 5%, respectively, to the reduced steel slag having the chemical composition shown in (4) · (a) above, so as to give a chemical composition not leading to the precipitation of free lime in the resultant oxidized steel slag, i.e., so as to achieve a chemical composition situated on the side of higher $SiO_2$ content relative to the line connecting $3CaO.SiO_2$ and $3CaO.Al_2O_3$ in the CaO—$SiO_2$—$Al_2O_3$ ternary constitutional diagram. Furthermore, a certain amount of $Fe_2O_3$ was added so as to give the similar $Fe_2O_3/Al_2O_3$ ratio as in the conventional cement, with a view to facilitating comparison with the conventional cement. The mixtures obtained as a result were oxidized under the same conditions as those described in (4) · (a) above. Cements were obtained by finely pulverizing the clinkers of oxidized steel slag thus obtained. Measurement of the 1:2 mortar strength of said cements gave results as shown in Table 6.

Table 6

| Constituents added to reduced steel slag and amount of addition | Specific surface area (pulverizing particle size) (cm$^2$/g) | Water/ cement ratio (W/C) | Compressive strength (kg/cm$^2$) | | |
|---|---|---|---|---|---|
| | | | 3 days | 7 days | 28 days |
| $SiO_2$ : 5% | 2,840 | 0.58 | 174 | 298 | 375 |
| $Fe_2O_3$ : 0.43% $SiO_2$ : 5% | 3,600 | 0.58 | 172 | 244 | 392 |
| $Fe_2O_3$ 0 0.43% $SiO_2$ : 3% | 4,100 | 0.58 | 216 | 391 | 503 |
| $Fe_2O_3$ : 0.43% $SiO_2$ : 3% | 4,780 | 0.58 | 301 | 453 | 543 |
| $Fe_2O_3$ : 0.78% $SiO_2$ : 1.5% $Fe_2O_3$ : 0.39% | 4,730 | 0.58 | 358 | 502 | 622 |

In the CaO—$SiO_2$—$Al_2O_3$ ternary constitutional diagram, as is clear from the comparison of Table 6 with Table 5, the strength of a cement having a chemical composition situated on the side of higher $SiO_2$ content relative to the line connecting $3CaO.SiO_2$ and $3CaO.Al_2O_3$ (i.e., any of the cements given in Table 6) is superior to the strength of a cement having a chemical composition situated on the side of higher CaO content (i.e., any of the cements given in Table 5).

As shown in Table 6, the strength of the cement obtained by adding 5 % $SiO_2$ and having a $CaO/SiO_2$ ratio of under 2.61 is not particularly superior to the strength of a conventional cement having a particle size as represented by the specific surface area of 3,300 cm$^2$/g. However, the cement obtained by adding 3% $SiO_2$ and having a $CaO/SiO_2$ ratio of from 2.61 to 3.27 has a strength well comparable to that of the high-early-strength Portland cement having a specific surface area of 4,100 cm$^2$/g. Especially, the cement obtained by adding 1.5% $SiO_2$ and having a $CaO/SiO_2$ ratio of from 2.61 to 3.27 has a strength far superior to that of the extra-high-early-strength Portland cement having a particle size as represented by the specific surface area of 6,000 cm$^2$/g, and has a further increased early-strength.

The aforementioned results shows that a $CaO/SiO_2$ ratio of from 2.61 to 3.27 is desirable.

The water/cement ratio of 0.58 for the cements given in Table 6 is lower than that for a conventional ccement of 0.65. This is due to the fact that, because of the very slight content of $3CaO.Al_2O_3$, the cements given in Table 6 have a satisfactory fluidity even with a low water/cement ratio.

(c) Addition of $Fe_2O_3$:

In the manufacture of the conventional cement, tetracalcium ferro-aluminate ($4CaO.Al_2O_3.Fe_2O_3$) is considered to be a constituent necessary for inhibiting the formation of tricalcium aluminate ($3CaO.Al_2O_3$), and $Fe_2O_3$ is added with a view to producing $4CaO.Al_2O_3.Fe_2O_3$, in addition to the reason as mentioned previously. However, there is available only a very limited effect of improving the strength of cement by the $4CaO.Al_2O_3.Fe_2O_3$ constituent.

In the steel slag cement of the present invention, in contrast, the amount of produced $3CaO.Al_2O_3$ is very slight because of the low $Al_2O_3$ content of from 1 to 3% and the $CaF_2$ content of from 0.3 to 2.0%. In the present invention, therefore, it is not necessary to add $Fe_2O_3$ intentionally for the purpose of producing $4CaO.Al_2O_3.Fe_2O_3$ which inhibits formation of $3CaO.Al_2O_3$. Furthermore, a smaller $Fe_2O_3$ content is more favorable for an increase in the amount of produced $3CaO.SiO_2$ which is a principal factor for the early-strength and the high-strength of cement, as described previously.

With the aforementioned facts in view, the steel slag cement of the present invention was manufactured by adding only $SiO_2$ under the same conditions as those described in (4) · (b) above, without adding $Fe_2O_3$ which had been added in the case of the cements given in Table 6, so as to give the same $Fe_2O_3/Al_2O_3$ ratio as that for a conventional cement to facilitate comparison with the conventional cement. Measurement of the 1:2 mortar strength of said steel slag cement gave results as shown in Table 7.

Table 7

| Constituents added to reduced steel slag and amount of addition | Specific surface area (pulverizing particle size) (cm$^2$/g) | Water/ cement ratio (W/C) | Compressive strength (kg/cm$^2$) | | |
|---|---|---|---|---|---|
| | | | 3 days | 7 days | 28 days |
| $SiO_2$ : 3% $Fe_2O_3$ : None | 3,830 | 0.58 | 229 | 365 | 517 |
| $SiO_2$ : 1.5% $Fe_2O_3$ : None | 4,780 | 0.52 | 522 | 595 | 701 |

As is evident from the comparison of Table 7 with Table 6, the strength of the steel slag cement of the present invention having a particle size as represented by the specific surface area of 3,830 cm$^2$/g with addition of 3% $SiO_2$ and without addition of $Fe_2O_3$ (refer to Table 7) is only slightly superior to the strength of the cement outside the scope of the present invention having a particle size as represented by the specific surface area of 4,100 cm$^2$/g with addition of 3% $SiO_2$ and 0.43% $Fe_2O_3$ (refer to Table 6). On the other hand, the strength of the steel slag cement of the present invention having a particle size as represented by the specific surface area of 4.780 cm$^2$/g with addition of 1.5% $SiO_2$ and without addition of $Fe_2O_3$ (refer to Table 7) is considerably improved as compared with the strength of the cement outside the scope of the present invention having a particle size as represented by the specific surface area of 4,730 cm$^2$/g with addition of 1.5% $SiO_2$ and 0.39% $Fe_2O_3$ (refer to Table 6).

Figure 2:
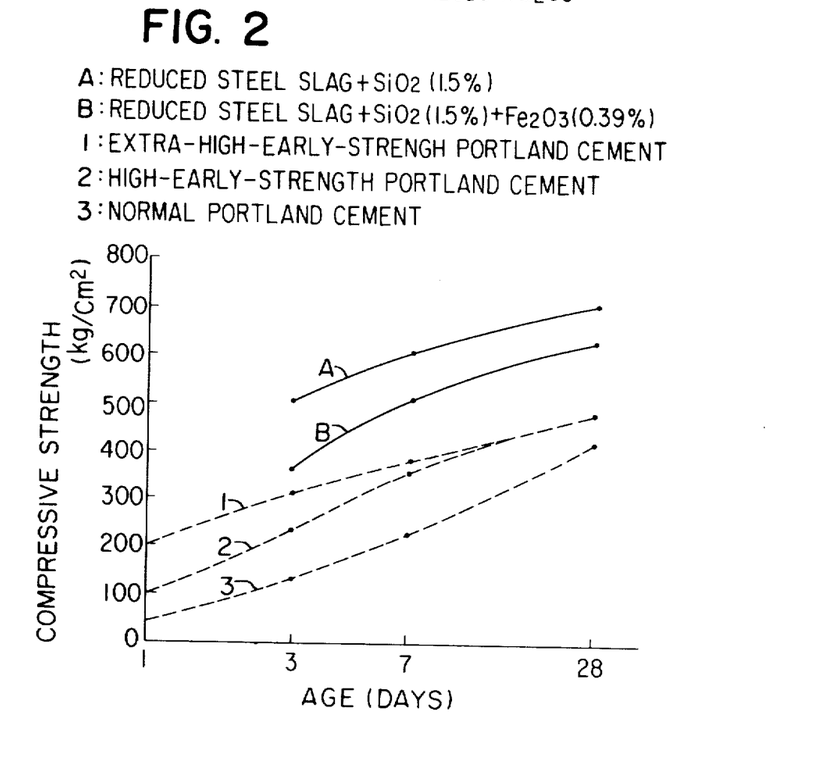
FIG. 2 is a graph illustrating the relation between the compressive strength and the age in the case of 1:2 mortar, as to the steel slag cement of the present invention and various conventional Portland cements outside the scope of the present invention.

FIG. 2 illustrates respective 1:2 mortar strengths of the steel slag cement of the present invention manufactured by oxidizing the reduced steel slag mixed only with 1.5% $SiO_2$ (refer to Table 7), the steel slag cement outside the scope of the present invention manufactured by oxidizing the reduced steel slag mixed with 1.5% $SiO_2$ and 0.39% $Fe_2O_3$ (refer to Table 6), the extra-high-early-strength Portland cement, the high-early-strength Portland cement and the normal Portland cement. In FIG. 2, A is the steel slag cement of the present invention manufactured from the reduced steel slag mixed only with 1.5% $SiO_2$; B is the steel slag cement outside the scope of the present invention manufactured from the reduced steel slag mixed with 1.5% $SiO_2$ and 0.39% $Fe_2O_3$; 1 is the extra-high-early-strength Portland cement; 2 is the high-early-strength Portland cement; and 3 is the normal Portland cement.

As shown in FIG. 2, the strength of the steel slag cement A of the present invention is far superior not only to that of the various conventional Portland cements 1 to 3, but also to that of the steel slag cement B having the chemical composition outside the scope of the present invention manufactured by oxidizing the reduced steel slag mixed with $SiO_2$ and $Fe_2O_3$.

The present invention is based on the knowledge described in detail in sections (1) to (4) above. The steel slag cement of the present invention, which is obtained by finely pulverizing an oxidized steel slag as described in detail above, is usually finished into a final product by adding and mixing gypsum in an appropriate amount with a view to reducing the flash setting property of cement as in the various conventional Portland cements. However because the addition of gypsum is the usual practice well known to the ordinarily skilled person in the field, explanation thereof is omitted here.

For the purpose of arranging the above description in order, the features of the steel slag cement of the present invention (simply called "said cement" in the following enumeration of features) are as follows:

(1) Said cement is manufactured from a steel slag discharged from a steelmaking furnace such as a converter, an open-hearth furnace and an electric arc furnace;

(2) Said cement is manufactured by reducing and then oxidizing said steel slag;

(3) Said cement consists of:
    CaO: 68 to 72%,
    $SiO_2$: 22 to 26%,
    $Al_2O_3$: 1 to 3%,
    $Fe_2O_3$: 0.2 to 1.0%, $P_2O_5$: 0.1 to 0.6%,
$TiO_2$: 0.4 to 0.9%,
MnO: trace to 0.4%,
MgO: 0.3 to 3.0%,
$CaF_2$: 0.3 to 2.0%, and
the balance incidental impurities;

(4) Said cement has a $CaO/SiO_2$ ratio of from 2.61 to 3.27;

(5) In said cement, in the $CaO-SiO_2-Al_2O_3$ ternary constitutional diagram, the area of the range of the CaO, $SiO_2$ and $Al_2O_3$ contents is situated on the side of higher $SiO_2$ content relative to the line connecting $3CaO.SiO_2$ and $3CaO.Al_2O_3$, said area not being traversed by the line connecting $3CaO.SiO_2$ and $12CaO.7Al_2O_3$;

(6) In said cement, CaO and $SiO_2$ are present principally in the form of $3CaO.SiO_2$ and almost no $3CaO.Al_2O_3$ is present;

(7) In manufacturing said cement, reduction of the steel slag is carried out in molten state of said steel slag in an arbitrary furnace by adding a carbonaceous agent as the reducing agent;

(8) In the reduced steel slag obtained by said reduction, there are present carbides ($CaC_2$) in an amount of from 1 to 7 wt.%, preferably from 2 to 5 wt.% as expressed in carbon content;

(9) Removal of such constituents detrimental to cement as phosphorus and manganese and adjustment of the chemical composition are achieved through said reduction;

(10) In manufacturing said cement, oxidation of the reduced steel slag may be conducted either as to the reduced steel slag in molten state or as to the reduced steel slag in solid state;

(11) In the oxidized steel slag obtained by said oxidation, carbon in the form of carbides ($CaC_2$) and free lime are scarcely present;

(12) $SiO_2$ and/or CaO, especially $SiO_2$, may sometimes be added in a small amount to adjust the chemical composition of said cement, but no other constituents are added. Especially, $Al_2O_3$ and $Fe_2O_3$ are not added as in the manufacture of the conventional cement.

Now, methods for manufacturing the steel slag cement of the present invention are described with reference to the drawings.

Figures 3, 4:
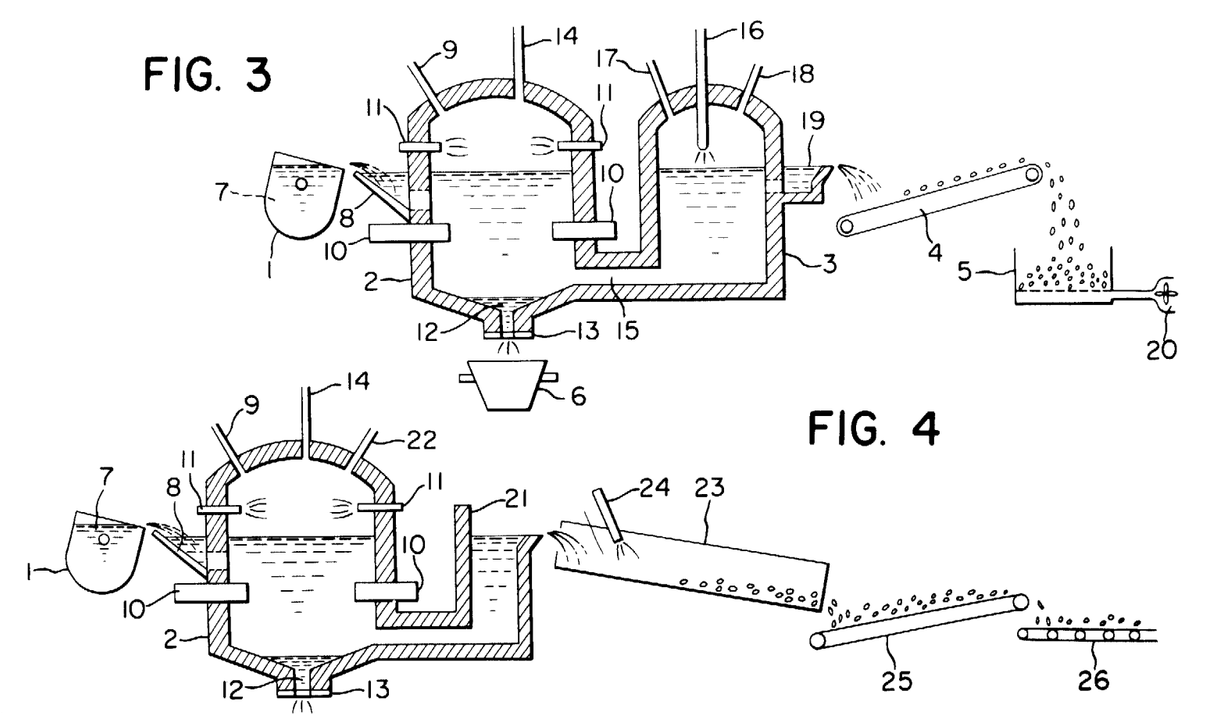
FIG. 3 is a drawing illustrating an example of apparatus for carrying out the method for manufacturing a steel slag cement of the present invention.
FIG. 4 is a drawing illustrating another example of apparatus for carrying out the method for manufacturing a steel slag cement of the present invention.

FIG. 3 is a drawing illustrating an apparatus for carrying out the method for manufacturing the steel slag cement of the present invention, which comprises continuously effecting the reduction step of a steel slag and the oxidation step of the reduced steel slag both in molten state. In FIG. 3, 1 is a ladle for receiving and transporting a molten steel slag 7 discharged from a steelmaking furnace such as a converter, an open-hearth furnace or an electric arc furnace; 2 is a reduction furnace for reducing said molten steel slag 7; 3 is an oxidation furnace for oxidizing the molten reduced steel slag thus obtained; 4 is a cooling conveyor for cooling and solidifying the molten oxidized steel slag thus obtained; 5 is a reservoir for storing the clinker of the oxidized steel slag thus obtained; and, 6 is a ladle for receiving the molten metal separated from the molten steel slag in said reduction furnace 2.

As shown in FIG. 3, the molten steel slag 7 received in the ladle 1 is fed into the reduction furnace 2 through an inlet port 8 provided on the reduction furnace 2 by tilting the ladle 1. By so doing, the molten steel slag 7 simultaneously flows also into the oxidation furnace 3 through a conduit 15 connecting the reduction furnace 2 and the oxidation furnace 3.

In this state, electrodes 10 installed in the reduction furnace 2 are energized and a gaseous or liquid fuel injected through burners 11 installed in the reduction furnace 2 is burned. The molten steel slag in the reduction furnace 2 is thus heated and reduced while adding a carbonaceous reducing agent through a chute 9 provided on the reduction furnace 2. Heating of the molten steel slag may be based on the method using an Heroult type electric furnace.

Molten reduced metals such as Fe, Mn and Ti produced during the above-mentioned reduction step of the molten steel slag, are separated from the molten steel slag and are accumulated on the bottom of the reducing furnace 2. Said molten reduced metals are from time to time discharged into a ladle 6 by operating a shutter means 13 such as a rotary nozzle provided at the bottom of the reduction furnace 2. Waste gases such as a gas produced by the reduction reactions in the reduction furnace 2 and a gas produced by the combustion of the fuel are discharged to outside the reduction furnace 2 through a duct 14. To said waste gases, are applied a heat collecting treatment and collecting and eliminating treatments of dust and evaporated matters based on known methods and apparatus.

Starting from the moment of the completion of reduction of the molten steel slag in the reduction furnace 2, by further feeding the reduction furnace 2 with the molten steel slag continuously little by little through the inlet port 8, the molten steel slag reduced as described above flows into the oxidation furnace 3 through the conduit 15 while pushing out the molten steel slag not reduced in the oxidation furnace 3 through an outlet port 19 provided on the oxidation furnace 3. Oxidation of the molten reduced steel slag in the oxidation furnace 3 is started as follows from the moment when the unreduced molten steel slag in the oxidation furnace 3 has completely been replaced in this manner by the molten reduced steel slag. More specifically, the molten reduced steel slag in the oxidation furnace 3 is oxidized by supplying oxygen into the oxidation furnace 3 from an oxygen lance 16 installed in the oxidation furnace 3 while adding silica sand into the oxidation furnace 3 through a chute 17 provided on the oxidation furnace 3 for the chemical composition adjustment.

During the aforementioned oxidation step, carbides ($CaC_2$) produced in the molten reduced steel slag, which react with the oxygen supplied, produce large quantities of CO gas and $CO_2$ gas, thus causing bubbling of the molten steel slag in the oxidation furnace 3, as described previously. Said produced gases are discharged to outside the oxidation furnace 3 through a duct 18. To said waste gases, are applied a heat collecting treatment and collecting and eliminating treatments of dust and evaporated matters based on known methods and apparatus.

The molten steel slag reduced in the reduction furnace 2 may be transferred from the reduction furnace 2 to the oxidation furnace 3 by an appropriate transfer means without connecting the reduction furnace 2 and the oxidation furnace 3 with the conduit 15, but by separately installing said furnaces 2 and 3.

Because the molten steel slag is fed continuously little by little to the reduction furnace 2 as mentioned above, the sufficiently oxidized molten steel slag is discharged continuously little by little onto the cooling conveyor 4 through the outlet port 19, and is cooled and solidified into clinker while travelling on said cooling conveyor 4. Said cooling conveyor 4 may well be replaced by a pig casting machine type or rotary drum type cooling means.

The oxidized steel slag cooled and solidified during the travel on the cooling conveyor 4, i.e., the clinker, is stored in the reservoir 5, then sent to a pulverizer not shown in the drawing, and finely pulverized into a desired particle size, whereby the steel slag cement of the present invention is manufactured. With a view to preventing decomposition of $3CaO.SiO_2$ produced during the oxidation step mentioned above, it is desirable to quench said clinker in the temperature range of under 1,200° C. For this purpose, a blower 20 for quenching the clinker is provided in the reservoir 5.

For simple and easy explanation, FIG. 3 represents the case with one reduction furnace and one oxidation furnace. If reduction and oxidation of molten steel slag are carried out with a single furnace, respectively, in a continuous operation comprising a reduction step and an oxidation step as mentioned above, sufficient reactions cannot usually be expected. It is therefore desirable to cause sufficient reactions by connecting from 2 to 4 furnaces in series each for reduction and oxidation.

FIG. 4 is a drawing illustrating another apparatus for carrying out the method for manufacturing the steel slag cement of the present invention, which comprises reducing the steel slag in molten state, and oxidizing the reduced steel slag partly in molten state and partly in solid state. In FIG. 4, a reference numeral indicates the same thing as that represented by the same reference numeral in FIG. 3.

Also in the apparatus shown in FIG. 4, as in the apparatus described above with reference to FIG. 3, the molten steel slag 7 received in the ladle 1 is fed into the reduction furnace 2 through the inlet port 8 provided on the reduction furnace 2 by tilting the ladle 1. By so doing, the molten steel slag 7 simultaneously flows also into a reservoir 21 installed adjacent to the reduction furnace 2.

In this state, electrodes 10 installed in the reduction furnace 2 are energized and a gaseous or liquid fuel injected through burners 11 installed in the reduction furnace 2 is burned. The molten steel slag in the reduction furnace 2 is thus heated and reduced while adding a carbonaceous reducing agent through the chute 9 provided on the reduction furnace 2.

Discharge of the molten reduced metal 12 produced during the reduction step of the molten steel slag mentioned above into the ladle 6 by operating the shutter means 13, discharge of waste gases to outside the reduction furnace 2 through the duct 14, and the application of a heat collecting treatment to said waste gases and collecting and eliminating treatments to dust and evaporated matters, are the same as in the apparatus described above with reference to FIG. 3.

Starting from the moment of the completion of reduction of the molten steel slag in the reduction furnace 2, by further feeding the reduction furnace 2 with the molten steel slag continuously little by little through the inlet port 8, the molten steel slag reduced flows into the reservoir 21 while pushing out the molten steel slag not reduced in the reservoir 21. Introduction of said molten reduced steel slag from said reservoir 21 into an oxidation kiln 23 installed adjacent to said reservoir 21 is started from the moment when the unreduced molten steel slag in the reservoir 21 has been completely replaced in this manner by the reduced molten steel slag.

For the adjustment of chemical composition, silica sand $(SiO_2)$ is added through a chute 22 installed on the reduction furnace 2 into the reduction furnace 2.

The molten reduced steel slag introduced into the oxidation kiln 23, which is in molten state in the initial stage of introduction, changes state into a solid, i.e., clinker, when discharged from the oxidation kiln 23.

Burners 24 are installed in the oxidation kiln 23 for the purpose of converting the furnace atmosphere into an oxidizing one as well as keeping the high furnace temperature, so as to sufficiently burn carbides $(CaC_2)$ produced in the reduced steel slag and leave no free lime in said slag. To waste gases from the oxidation kiln 23, are applied a heat collecting treatment and collecting and eliminating treatments of dust and evaporated matters based on known methods and apparatus.

Because the molten steel slag is fed continuously little by little to the reduction furnace 2 as mentioned above, the sufficiently oxidized solid steel slag, i.e., clinker, is discharged continuously little by little from the oxidation kiln 23 onto a cooling conveyor 25, and is quenched in the temperature range of under 1,200° C. A known apparatus practically used in a cement plant, a sintering plant or a pellet plant may be used as the means for cooling the clinker.

The cooled clinker is transferred by a belt-conveyor 26 to a reservoir not shown in the drawing, then sent to a pulverizer also not shown in the drawing, and finely pulverized into a desired particle, whereby the steel slag cement of the present invention is manufactured.

Also in the apparatus shown in FIG. 4, it is desirable to install a plurality of reduction furnaces 2 connected in series, as in the case of the apparatus described above with reference to FIG. 3.

Furthermore, in the apparatus shown in FIG. 4, in place of introducing the molten reduced steel slag from reservoir 21 into the oxidation kiln 23, said molten reduced steel slag may be introduced from reservoir 21 into a pig casting machine type mould to cool and solidify said slag, and the resultant solid reduced steel slag may be allowed to undergo dusting phenomenon to subsequently oxidize the resultant powdery reduced steel slag as described later.

Figure 5:
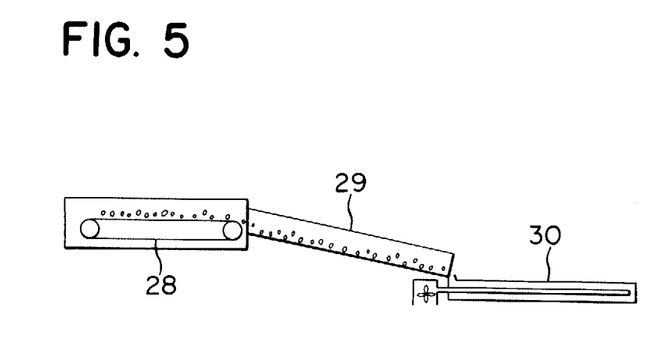
FIG. 5 is a drawing illustrating further another example of apparatus for carrying out the method for manufacturing a steel slag cement of the present invention.

FIG. 5 is a drawing illustrating further another apparatus for carrying out the method for manufacturing the steel slag cement of the present invention, which comprises reducing the molten steel slag in batch manner, and oxidizing the reduced steel slag in solid state.

In FIG. 5, 27 is an Heroult type electric furnace used for reducing a steel slag discharged from a steelmaking furnace such as a converter, an open-hearth furnace or an electric arc furnace. A furnace body 31 of the electric furnace 27 is provided with wheels 32 at the bottom thereof, receives a steel slag and is movable. A lid 33 of the electric furnace 27 and electrodes 34 are supported by a lift 35 and are vertically movable. A known Lepol-kiln is composed of a preheater 28, a rotary kiln 29 and a cooler 30.

The furnace body 31 is first moved to a prescribed position and receives a molten steel slag from a steelmaking furnace such as a converter, an open-hearth furnace or an electric arc furnace. Then, the furnace body 31 having received the molten steel slag is moved to immediately below the lid 33. Subsequently, the lid 33 is lowered by the lift 35 to place the lid 33 on the furnace body 31, while the electrodes 34 are energized while adding a carbonaceous reducing agent through a chute 36 provided on the lid 33, to heat and reduce the molten steel slag in the furnace body 31.

Gases produced during the above-mentioned reduction step are discharged outside the furnace 27 through a duct 37 provided on the lid 33. To said waste gases, are applied a heat collecting treatment and collecting and eliminating treatments of dust and evaporated matters based on known methods and apparatus. Molten reduced metals such as Fe, Mn and Ti accumulated on the bottom of the furnace body 31 are discharged through a tap hole 38 into the ladle 6 after the completion of the reduction step.

After the completion of reduction of the molten steel slag as mentioned above, the lid 33 and the electrodes 34 are raised by the lift 35 and taken away from the furnace body 31, and the furnace body 31 containing the molten reduced steel slag is moved to an appropriate location to allow to cool, while waiting for cooling of said molten reduced steel slag and powdering thereof by dusting phenomenon.

The resultant powdery reduced steel slag is mixed with silica sand ($SiO_2$), mixed and pelletized. Then, said reduced steel slag thus pelletized is charged into the preheater 28, and said pelletized reduced steel slag is oxidized by the known Lepol-kiln system to obtain clinker. Said clinker is cooled, then finely pulverized to a desired particle size and thus the steel slag cement of the present invention is manufactured just as described as to the apparatus shown in FIGS. 3 and 4.

In the apparatus shown in FIGS. 3 and 4, the molten reduced steel slag in the reduction furnace should have a sufficient fluidity. It is therefore necessary to hold a high temperature of at least 1,800° C. In the apparatus shown in FIG. 5, on the contrary, it is not necessary for the molten reduced steel slag to be so rich in fluidity. A temperature of up to 1,800 ° C. therefore suffices. However, because such constituents as Fe, Mn and Ti in the molten steel slag decrease along with the progress of reduction in the reduction furnace, the melting point of said molten steel slag rises rapidly. In the apparatus shown in FIG. 5, accordingly, metals produced during the initial stage of the reduction step are easily separated from the steel slag and are accumulated on the bottom of the furnace body 31, whereas, toward the end of the reduction step, the fluidity of the molten steel slag is decreased as mentioned above, and the produced metals partially remain in the form of particles in the molten reduced steel slag. It is therefore desirable to separate the metal particles from the powdery reduced steel slag by magnetic separation when the molten reduced steel slag has been solidified and then powdered by the dusting phenomenon after the completion of the reduction step.

According to the present invention, as described above in detail, the following industrially useful effects are provided:

(1) Because the steel slag cement of the present invention comprises principally alite ($3CaO.SiO_2$) and contains almost no tricalcium aluminate ($3CaO.Al_2O_3$), it is possible to reduce the amount of gypsum to be added for retarding the flash setting property of cement. Therefore, the steel slag cement of the present invention, which contains only small quantities of $3CaO.Al_2O_3$ and gypsum producing much heat, produces a considerably small quantity of heat when considering the high-early-strength.

(2) In general, such alkaline constituents as $Na_2O$ and $K_2O$ in cement are considered as undesirable constituents which cause shrinkage of concrete, and it is suggested to avoid inclusion thereof in a cement. In the manufacture of a conventional cement, however, a clay is used as the $Al_2O_3$ source, and said clay contains these alkaline constituents. It is therefore inevitable that the conventional cement should contain about 1% alkaline constituents. In the steel slag cement of the present invention, in contrast, these alkaline constituents are mostly removed through evaporation during the reduction step of steel slag as described above, and the resultant cement contains almost no such alkaline constituents.

(3) The fluidity obtained with a water/cement (W/C) ratio of about 0.65 in a conventional cement is available with a water/cement ratio of about 0.55 in the steel slag cement of the present invention. This facilitates the full display of the high-strength property of the steel slag cement of the present invention.

(4) The conventional blast furnace cement is manufactured by blending a blast furnace water-granulated slag and a normal Portland cement, and is considered defective in that the early-strength is low as compared with the normal Portland cement. However, by using the steel slag cement of the present invention in place of the normal Portland cement, a blast furnace cement with a remarkably improved early-strength (hereinafter called the "improved blast furnace cement") is available.

For instance, the steel slag cement of the present invention mixed with 1.5% $SiO_2$ as shown in Table 7 was blended with a blast furnace water-granulated slag in ratios as shown in Table 8, to manufacture the improved blast furnace cements A, B and C, and the 1:2 mortar strength was measured. Results as shown in Table 8 were obtained.

Table 8

| Kind of improved blast furnace cement | Blending ratio (wt.%) | | Compressive strength (kg/cm$^2$) | | |
| | steel slag cement of the present invention | Blast furnace water-granulated slag | 3 days | 7 days | 28 days |
| --- | --- | --- | --- | --- | --- |
| A | 30 | 70 | 283 | 398 | 549 |
| B | 50 | 50 | 208 | 307 | 459 |
| C | 35 | 65 | 139 | 284 | 430 |

Figure 6:
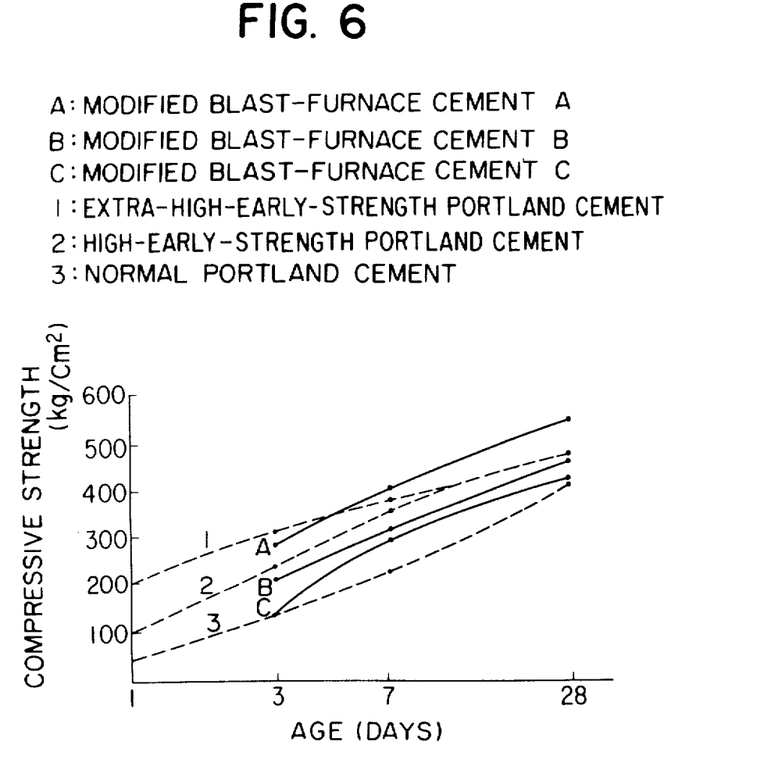
FIG. 6 is a graph illustrating the relation between the compressive strength and the age in the case of 1:2 mortar, as to an improved blast furnace cement manufactured with the use of the steel slag cement of the present invention and as to various Portland cements outside the scope of the present invention.

FIG. 6 illustrates respective 1:2 mortar strengths of the improved blast furnace cements A, B and C, the extra-high-early-strength Portland cement, the high-early-strength Portland cement and the normal Portland cement. In FIG. 6, A is the improved blast furnace cement A; B is the improved blast furnace cement B; C is the improved blast furnace cement C; 1 is the extra-high-early-strength Portland cement; 2 is the high-early-strength Portland cement; and 3 is the normal Portland cement.

As is evident from Table 8 and FIG. 6, the improved blast furnace cements A, B, and C manufactured by blending the steel slag cement of the present invention and a blast furnace water-granulated slag, have a remarkably improved early-strength equal or even superior to those of the various Portland cements.

What is claimed is:

1. A steel slag cement manufactured from a steel slag, which consists of, in percentage:
CaO: 68 to 72%, SiO$_2$: 22 to 26%,
Al$_2$O$_3$: 1 to 3%,
Fe$_2$O$_3$: 0.2 to 1.0%,
P$_2$O$_5$: 0.1 to 0.6%,
TiO$_2$: 0.4 to 0.9%,
MnO: trace to 0.4%,
MgO: 0.3 to 3.0%,
CaF$_2$: 0.3 to 2.0%
and the balance incidental impurities,
wherein in the ternary constitutional diagram of FIG. 1 of CaO—SiO$_2$—Al$_2$O$_3$, the area representing the range of the CaO, SiO$_2$ and Al$_2$O$_3$ contents is situated on the side of higher SiO$_2$ content relative to the line connecting 3CaO.SiO$_2$ and 3CaO.Al$_2$O$_3$, said area not being traversed by the line connecting 3CaO.SiO$_2$ and 12CaO.7Al$_2$O$_3$.

2. The steel slag cement as claimed in claim 1, wherein the CaO/SiO$_2$ ratio is within the range from 2.61 to 3.27.

3. The steel slag cement as claimed in claim 1, wherein CaO and SiO$_2$ are present principally in the form of 3CaO.SiO$_2$, and said steel slag cement is substantially free of 3CaO.Al$_2$O$_3$.

4. The steel slag cement as claimed in claim 2, wherein CaO and SiO$_2$ are present principally in the form of 3CaO.SiO$_2$, and said steel slag cement is substantially free of 3CaO.Al$_2$O$_3$.

5. The steel slag cement as claimed in claim 1, wherein said steel slag cement is substantially free of free lime and alkaline constituents.

6. The steel slag cement as claimed in claim 2, wherein said steel slag cement is substantially free of free lime and alkaline constituents.

7. The steel slag cement as claimed in claim 3, wherein said steel slag cement is substantially free of free lime and slkaline constituents.

8. The steel slag cement as claimed in claim 4, wherein said steel slag cement is substantially free of free lime and alkaline constituents.

9. A method for manufacturing a steel slag cement, which comprises:
preparing a reduced steel slag by reducing a steel slag, discharged from a steelmaking furnace, in a reduction furnace while adding a carbonaceous reducing agent, constituents detrimental to cement contained in said steel slag being mostly removed through said reduction treatment, and the chemical composition of said reduced steel slag being adjusted principally during said reduction treatment;
preparing an oxidized steel slag by oxidizing said reduced steel slag in an oxidation furnace while adding SiO$_2$ as a chemical composition adjusting agent as required; and
finely pulverizing said oxidized steel slag.

10. The method as claimed in claim 9, wherein said reduction treatment is effected until carbides, CaC$_2$, are produced in an amount of from 1 to 7 weight percent as expressed in carbon content in said reduced steel slag.

11. The method as claimed in claim 9, wherein said reduction treatment is effected until carbides, CaC$_2$, are produced in an amount of from 2 to 5 weight percent as expressed in carbon content in said reduced steel slag.

12. The method as claimed in claim 9, wherein said oxidation treatment is effected to said reduced steel slag in molten state.

13. The method as claimed in claim 9, wherein the first half of said oxidation treatment is effected to said reduced steel slag in molten state, and then, the latter half of said oxidation treatment is effected to said reduced steel slag in solid state.

14. The method as claimed in claim 9, wherein said oxidation treatment is effected to said reduced steel slag in solid state.

15. The method as claimed in claim 9, wherein said reduction treatment and said oxidation treatment are continuously effected.

16. The method as claimed in claim 10, wherein said reduction treatment and said oxidation treatment are continuously effected.

17. The method as claimed in claim 11, wherein said reduction treatment and said oxidation treatment are continuously effected.

18. The method as claimed in claim 12, wherein said reduction treatment and said oxidation treatment are continuously effected.

19. The method as claimed in claim 13, wherein said reduction treatment and said oxidation treatment are continuously effected.

20. The method as claimed in claim 9, wherein powdered gypsum is mixed with said finely pulverized oxidized steel slag.

* * * * *